Dec. 27, 1932.    L. W. BROWNE    1,892,565
HIGH PRESSURE RELIEF VALVE
Filed Oct. 12, 1931

Inventor
Lyle W. Browne,
By
Attorneys

Patented Dec. 27, 1932

1,892,565

UNITED STATES PATENT OFFICE

LYLE W. BROWNE, OF MARSHALLTOWN, IOWA, ASSIGNOR TO THE FISHER GOVERNOR COMPANY, OF MARSHALLTOWN, IOWA

HIGH-PRESSURE RELIEF VALVE

Application filed October 12, 1931. Serial No. 568,469.

My invention consists in new and useful improvements in a single seated high pressure relief valve and has for its object to provide a device of this character which comprises a minimum number of parts, thus being extremely simple in construction and operation, as well as accurate and dependable in its performance.

Heretofore, relief valves of this nature have employed numerous levers, pivotal connections and springs, all of which reduced the sensitiveness of operation and durability of the apparatus. It is an object of my invention to overcome the disadvantages incident to these structures and to this end I have provided a single seated balanced valve provided with an inner auxiliary or relief valve, the latter being directly controlled by the action of a main diaphragm and single valve spring, eliminating the necessity of a plurality of springs and other connecting elements.

A further object of my invention resides in the complete assembly which includes an auxiliary inner valve located in the main valve, said inner valve being directly controlled by the action of a diaphragm which in turn is regulated and actuated by a suitable pilot valve assembly. Furthermore, I have provided a relief valve in communication with the line leading to the pressure chamber of the main diaphragm to protect said diaphragm and its casing from excessive pressure.

With the above and other objects in view which will appear as the description proceeds, my invention consists in the novel features herein set forth, illustrated in the accompanying drawing and more particularly pointed out in the appended claims.

Figure 1:
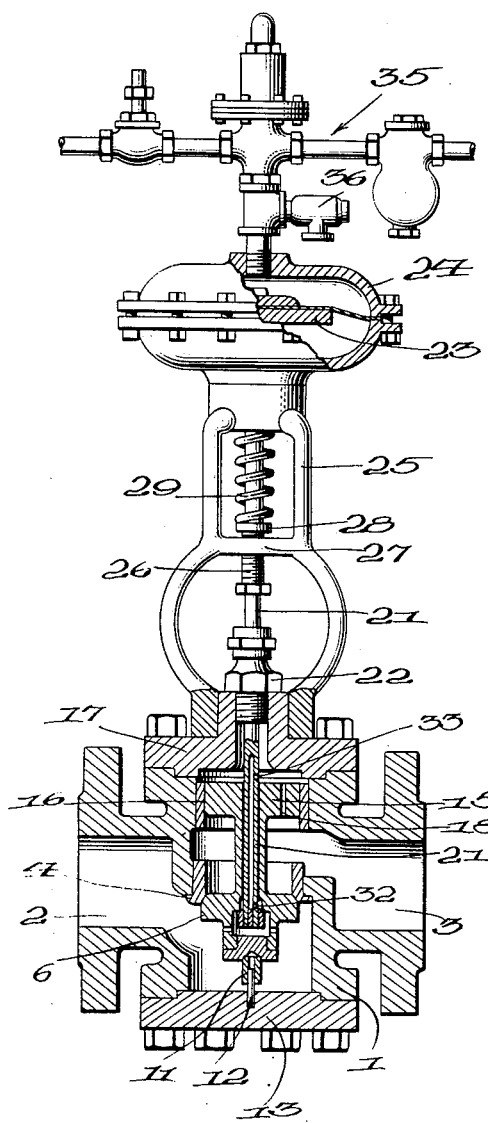
Figure 2:
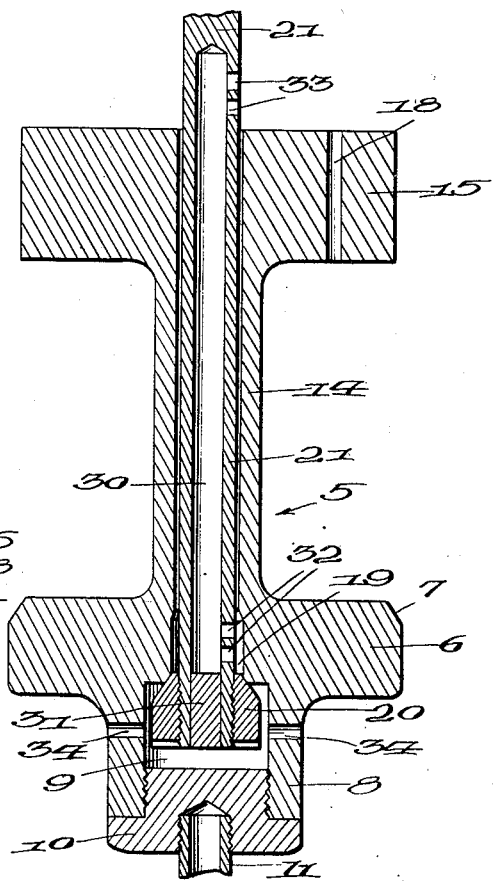

Referring to the drawing in which numerals of like character designate similar parts throughout both views, Fig. 1 is a view in side elevation showing the entire assembly with the valve body per se and the main valve diaphragm broken away and shown in section to illustrate the working parts, and Fig. 2 is an enlarged detail sectional view of the valve, balancing piston and inner auxiliary valve.

In the drawing, 1 represents a valve body having the conventional flanged inlet and outlet openings 2 and 3 respectively, the intermediate portion of the body carrying a horizontally disposed valve seat 4. 5 represents a valve member which comprises a single disc 6 beveled as at 7 around its upper edge to correspond with and closely engage the adjacent portion of the seat 4, the central portion of the lower extremity of said disc terminating in an annular extension 8 which forms the walls of a cylindrical chamber 9. This chamber 9 is closed at its underside by a threaded plug 10 which is provided centrally with a depending tube or sleeve like member 11, the latter being adapted to slidably embrace a pin 12 rigidly supported in the bottom plate 13 which closes the underside of the valve body 1. As will be hereinafter more fully set forth, the pin 12 and sleeve 11 co-operate to guide and centralize the valve disc 6 with respect to the seat 4, when said valve is opening or closing.

Above and spaced apart from the valve disc 6, but joined thereto by a hollow sleeve 14 is a balancing disc or piston 15 which is adapted to fit and operatively engage a cylindrical chamber or pressure cylinder 16 in the upper portion of the valve body 1, the upper portion of said cylinder being closed by the flanged top plate 17. As will be seen from Fig. 2, the balancing disc or piston 15 is vertically apertured or drilled as at 18 for the purpose hereinafter set forth.

The central opening or passageway of the sleeve 14 extends through the balancing piston 15 and the valve disc 6, terminating at its lower extremity in a slightly enlarged area 19 which opens into the chamber 9. The lower edge of the enlarged area 19 is beveled and forms a seat for the auxiliary valve head 20, the latter being beveled at its upper end to tightly engage said seat, and carried at the lower end of a partially hollow stem 21, which extends upwardly through a suitable stuffing box 22 in the top of the valve body 1 and is operatively connected to the head of a diaphragm 23. It will be noted that although the valve stem 21 extends into the main valve structure, it is not directly connected to the valve head as is usually the case.

The diaphragm 23 is located in a conventional diaphragm casing 24 which is carried by a suitable yoke 25 supported by the valve body 1. 26 represents a spring adjusting member which is externally threaded to engage complementary threads in a web or cross-piece 27 on the yoke 25, the upper extremity of said adjusting member being flanged as at 28 to support the lower end of a coil spring 29. This adjusting member 26 is drilled centrally to slidably receive the valve stem 21 and when the spring 29 is in place, it encircles the valve stem between the flange 28 on the adjusting member and the underside of the diaphragm head 23, whereby under normal conditions, the diaphragm head is forced upwardly which in turn causes the stem 21 and the auxiliary valve head 20 to move upwardly, the latter assuming a closed position with respect to the auxiliary valve seat.

The valve stem 21 is centrally and longitudinally drilled as at 30 to form a conduit for placing the chamber 9 in communication with that portion of the cylinder 16, above the balancing piston 15. The lower extremity of the conduit 30 is closed by a plug 31 whereby when the valve head 20 is seated, communication between chamber 9 and conduit 30 is cut off. When the valve head is open however, communication is established by transverse ports 32 and 33 extending through the wall of the conduit 30 in the hollow portion of the stem 21. The ports 32 are located at the lower end of the conduit 30 and open into the enlarged area 19 immediately above the auxiliary valve seat, while the ports 33 are arranged at the opposite end of the conduit 30 and open into the cylinder 16 above the balancing piston 15.

The chamber 9 is in communication with the inlet side 2 of the main valve 1 at all times, through the medium of ports 34 located in the annular wall of said chamber formed by the extension 8. Thus, as hereinafter more fully set forth, communication between the inlet side 2 of the main valve and the upper portion of the cylinder 16 above the balancing piston 15, is established through the medium of chamber 9 and conduit 30, said communication being governed by the operation of the auxiliary valve 20.

The upper or pressure chamber of the diaphragm casing 24 is preferably placed in communication with a pilot valve mechanism of any suitable type for actuating the diaphragm 23, or the diaphragm 23 may simply be arranged so as to be immediately responsive to the pressure in the up-stream side of the main valve 1. As the pilot valve structure per se forms no part of the present invention and may be any of several well-known types, I have illustrated the same purely in perspective in Fig. 1. To be more specific however, in an example of the type of pilot structure which may be employed with this relief valve, attention is directed to Patent No. 1,840,228 of Paul A. Elfers.

The purpose of the pilot valve assembly in connection with the present invention is to take a feeble impulse of the pressure to be relieved, that is from the inlet side 2 of the main valve, and apply said impulse through a multiplying means to the diaphragm head 23 for actuating the main valve.

Immediately adjacent the inlet to the pressure chamber in diaphragm casing 24, I preferably provide a small angle relief valve 36 of any suitable character for protecting the main diaphragm and casing from excessive pressure.

Having thus described the construction and assembly of my improved single seated high pressure relief valve, its operation is as follows:—

The auxiliary valve 20 is normally held closed by the action of the main valve spring 29 on the underside of diaphragm 23, which seats said auxiliary valve against the beveled face of the enlarged area or auxiliary valve seat, cutting off communication between the chamber 9 and cylinder 16. In this position the high pressure fluid to be relieved enters the main valve through the inlet opening 2 and causes an upward pressure on the underside of the main valve disc 6 which holds said valve in tight engagement against its seat 4.

Upon the increase of the pressure to be relieved beyond the desired amount, the pilot valve mechanism 35 causes the admission of pressure to the chamber above the diaphragm head 23 which results in the downward movement of said diaphragm. This in turn causes the downward movement of the stem 21 and with it the opening of the auxiliary valve head 20, thus permitting the pressure on the inlet side 2 of the main valve, which by the way is always transmitted to the chamber 9 surrounding the auxiliary valve head, to be communicated through ports 32, conduit 30 and ports 33 to the upper face of the balancing piston 15 in the cylinder 16.

Previous to this time the pressure on the inlet side of the main valve has been such as to hold the main valve in closed position, because of the fact that the pressure in the cylinder 16 on top of the balancing piston has been much lower than the inlet pressure at 2, and equal to that of the outlet 3, which might in some instances be atmospheric pressure. Now as the high pressure fluid from the inlet 2 passes through conduit 30 and fills the cylinder above the balancing piston 15, the effect is that the pressure on top of the piston practically balances the pressure on the bottom of the valve disc 6. The valve stem 21 continues to move downwardly until the head 20 of the auxiliary valve engages the bottom of chamber 9 or rather the top of plug 10 and pushes the main valve disc 6 off of its seat, permitting the flow of the high pressure fluid through the main valve port from the inlet or high side 2 to the outlet or discharge side 3. It will be noted that the sleeve 11 and rigid pin 12 centralize and support the main valve disc in its vertical movement.

This flow from inlet to outlet side of the main valve continues until the inlet pressure has reduced sufficiently to cause the pilot valve assembly 35 to drop the main valve diaphragm pressure. The main valve spring 29 then expands, forcing the diaphragm head upwardly and at the same time again closing the auxiliary valve 20 through the medium of the valve stem 21, cutting off the flow of fluid to the cylinder 16 above the balancing piston. This results in the escape through the vertical port 18 of the remainder of the pressure fluid which has accumulated in the cylinder 16 above the piston 15, which unbalances the main valve. The high pressure on the underside of the main valve disc 6 then forces the valve into a closed position where it remains until the inlet pressure again increases.

It will be noted that this operation is throttling in action and not intermittent, with the valve floating gradually open and closed according to the movement of the main valve stem which carries the auxiliary valve 20.

Although I have described my invention as primarily adapted for use as a high pressure relief valve, it is obvious that this same assembly may be employed with equal effect for numerous other services. Wherever pilot mechanism applies operating pressure to the main diaphragm, this device will operate. It might be used with a pilot valve for controlling reduced or low pressure, for controlling a differential pressure, vacuum, liquid level, temperature, or any other service where pilot mechanism controls the application of the controlling fluid or operating medium to the main valve diaphragm.

It is to be understood that numerous changes may be made in the details of structure without departing from the spirit of the invention as set forth in the appended claims. For example, while I have shown and described the plug 10 and sleeve 11 as separate elements, it is obvious that they may be formed integral if so desired. Likewise the valve stem 21, valve head 20 and the plug 31 for closing the conduit 30, which are shown and described as three separate members, may be constructed in one piece or any suitable combination, to simplify the assembly. Furthermore, the auxiliary lining of the cylinder 16, as shown in the drawing, may be eliminated and the cylinder machined as a part of the body casting.

It might also be added that in some instances, for example when this apparatus is used with an outside operating medium which has a maximum pressure of say twenty-five pounds, the angle relief valve 36 is unnecessary and may be eliminated. This relief valve is preferably employed only on those installations where the control fluid itself, at a pressure of say five hundred pounds, is stepped down and applied to the main diaphragm, in which case there is always the possibility of the full five hundred pounds pressure being applied to the diaphragm with resultant damage.

From the foregoing it is believed that the construction and operation of my improved structure may be readily understood by those skilled in the art without further description.

What I claim and desire to secure by Letters Patent is:—

1. A pressure relief valve comprising a valve body having inlet and outlet openings, a main valve disc for regulating the flow of fluid through said openings, a cylinder in said valve body, a pressure balancing piston carried by said disc and adapted to reciprocate within said cylinder, a passageway extending through said valve disc and balancing piston, an auxiliary valve mounted in said passageway and carried at the end of a valve stem, the latter being adapted to reciprocate in said passageway, the upper end of said valve stem being operatively connected to a pressure responsive element said valve stem having a longitudinally extending conduit therein for placing the area adjacent the underside of the valve disc in communication with said cylinder above said balancing piston, whereby upon the operation of said pressure responsive element, the auxiliary valve is first opened to admit pressure fluid to the cylinder to balance the valve disc, after which the continued movement of said pressure responsive element opens the main valve.

2. A pressure relief valve as claimed in claim 1 wherein said valve disc is provided with an abutment adapted to be engaged by a portion of said stem upon the movement of the latter to open the main valve.

3. A pressure relief valve as claimed in claim 1 wherein said valve disc is provided with an extension which forms a chamber opening into said passageway and within which said auxiliary valve operates, said chamber being in communication with the inlet side of the main valve.

4. A pressure relief valve as claimed in claim 1 wherein said valve disc is provided with an extension which forms a chamber opening into said passageway and within which said auxiliary valve operates, said chamber being in communication with the inlet side of the main valve, the lower end of said chamber being closed by a plug which forms an abutment for the lower extremity of said valve stem whereby said main valve is opened upon the downward movement of the valve stem and auxiliary valve.

5. A pressure relief valve as claimed in claim 1 including means for guiding and supporting said valve disc in opening and closing.

6. In combination, a pressure relief valve comprising a valve body having inlet and outlet openings, a main valve disc for regulating the flow of fluid through said openings, a cylinder in said valve body, a pressure balancing piston operatively connected to said valve disc and adapted to reciprocate within said cylinder, a passageway leading from the inlet side of the main valve to said cylinder above said piston, a valve stem adapted to reciprocate in said passageway and carrying an auxiliary valve for closing the lower end of said passageway, the upper end of said valve stem being connected to a pressure responsive element for opening said auxiliary valve, a conduit in said valve stem for conducting fluid from the inlet side of said valve disc to said cylinder above the piston when said auxiliary valve is opened, separate means for closing said auxiliary valve to shut off said conduit, and a pilot valve assembly for controlling the operation of said pressure responsive element.

7. A pressure relief valve comprising a valve body having inlet and outlet openings, a main valve disc for regulating the flow of fluid through said openings, a cylinder in said valve body, a pressure balancing piston carried by said valve disc and adapted to reciprocate within said cylinder, a passageway extending through said valve disc and piston, a valve stem slidably mounted in said passageway and loosely connected to said main valve disc, an auxiliary valve carried at one end to said valve stem and adapted to close said passageway, the other end of said stem being operatively secured to a pressure responsive element, a conduit extending through a portion of said valve stem and opening at one end within said passageway above said auxiliary valve, and at the other end in said cylinder above said balancing piston, whereby when said auxiliary valve is opened by the operation of said pressure responsive element, the pressure on the underside of said disc is transmitted through said passageway and conduit to said cylinder to balance said piston, the continued movement of said pressure responsive element causing said main valve to open.

8. A pressure relief valve comprising a valve body having inlet and outlet openings, a main valve disc for regulating the flow of fluid through said openings, a cylinder in said valve body, a pressure balancing piston operatively connected to said valve disc and adapted to reciprocate within said cylinder, a valve stem extending through said cylinder, piston and valve disc and loosely connected to the latter, whereby said valve stem is capable of a limited relative longitudinal movement with respect to said piston and valve disc, one end of said valve stem being operatively connected to an actuating element which is responsive to surrounding conditions of pressure, a conduit in said valve stem extending longitudinally thereof between that portion of the cylinder above said piston and that portion of the valve disc which is exposed to the inlet side of the valve body, whereby said inlet side is placed in communication with said cylinder, and an auxiliary valve carried by said valve stem for controlling the flow of fluid through said conduit, said actuating element, through the medium of said valve stem, being adapted to first operate said auxiliary valve to balance the piston and valve disc and afterwards actuate said main valve disc.

9. A pressure relief valve as claimed in claim 8 wherein said balancing piston is provided with a bleed opening for permitting the escape of pressure fluid from said cylinder to the outlet opening of the main valve.

10. A pressure relief valve as claimed in claim 8 wherein said actuating element consists of a diaphragm movable in one direction by a controlling pressure to open said auxiliary valve and valve disc, and separate means for closing said auxiliary valve and main valve disc.

11. A pressure relief valve comprising a valve body having inlet and outlet openings, a main valve disc for regulating the flow of fluid through said openings, a cylinder in said valve body, a pressure balancing piston carried by said valve disc and adapted to reciprocate within said cylinder, a passageway extending through said valve disc and piston and leading from the inlet side of said main valve to said cylinder above the piston, an elongated valve stem loosely connected at one end to the valve disc, its other end projecting through said valve body, a yoke carried by said valve body and supporting a diaphragm which is responsive to a controlling pressure, said diaphragm being operatively connected to the projecting end of said valve stem, an auxiliary valve carried at the other end of said valve stem for controlling the admission of pressure fluid to said passageway, a conduit in said valve stem for conducting pressure fluid from the inlet side of said valve to said cylinder above the piston, upon the opening of said auxiliary valve, said pressure responsive element, through the medium of said valve stem, being adapted to first operate said auxiliary valve to balance said piston and afterwards operate said main valve disc.

In testimony whereof I affix my signature.

LYLE W. BROWNE.